(12) United States Patent
Kubota et al.

(10) Patent No.: US 8,836,909 B2
(45) Date of Patent: Sep. 16, 2014

(54) METHOD FOR MANUFACTURING LIQUID CRYSTAL DISPLAY DEVICE

(75) Inventors: Daisuke Kubota, Kanagawa (JP); Akio Yamashita, Kanagawa (JP); Masaru Nakano, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 337 days.

(21) Appl. No.: 13/303,572

(22) Filed: Nov. 23, 2011

(65) Prior Publication Data

US 2012/0133881 A1    May 31, 2012

(30) Foreign Application Priority Data

Nov. 30, 2010  (JP) ................. 2010-267148

(51) Int. Cl.
| G02F 1/13 | (2006.01) |
| G02F 1/1333 | (2006.01) |
| C09K 19/02 | (2006.01) |
| G02F 1/1337 | (2006.01) |
| G02F 1/137 | (2006.01) |
| G02F 1/1341 | (2006.01) |

(52) U.S. Cl.
CPC .............. *G02F 1/137* (2013.01); *G02F 1/1341* (2013.01); *G02F 2001/13793* (2013.01); *G02F 2001/13775* (2013.01)
USPC ............. 349/188; 349/88; 349/168; 349/169; 349/191

(58) Field of Classification Search
CPC .................. G02F 2001/13793; G02F 1/13718; G02F 2001/13775; C09K 19/0275

USPC ........... 349/88, 168, 169, 175, 185, 187, 188, 349/191

See application file for complete search history.

(56) References Cited

U.S. PATENT DOCUMENTS

| 5,517,344 | A | 5/1996 | Hu et al. |
| 6,137,559 | A | 10/2000 | Tanaka et al. |
| 6,222,603 | B1 | 4/2001 | Sakai et al. |
| 6,831,725 | B2 | 12/2004 | Niiya |
| 7,193,678 | B2 | 3/2007 | Ueyama |
| 7,327,433 | B2 | 2/2008 | Miyachi et al. |
| 7,576,829 | B2 | 8/2009 | Kikuchi et al. |
| 7,623,215 | B2 | 11/2009 | Motomatsu |

(Continued)

FOREIGN PATENT DOCUMENTS

| EP | 1 743 931 A1 | 1/2007 |
| JP | 07-084254 A | 3/1995 |
| JP | 2003-327966 A | 11/2003 |
| WO | 2005/090520 A1 | 9/2005 |

*Primary Examiner* — Mark Robinson
*Assistant Examiner* — Robert Tavlykaev
(74) *Attorney, Agent, or Firm* — Fish & Richardson P.C.

(57) ABSTRACT

A liquid crystal display device which can exhibit a blue phase stably is manufactured. A first substrate and a second substrate are attached by a sealant interposing a liquid crystal layer comprising a liquid crystal composition therebetween, an alignment state of the liquid crystal layer is set to be an isotropic phase by heat treatment, the liquid crystal layer is irradiated with light so as to perform polymer stabilization treatment on the liquid crystal layer, and an alignment state of the liquid crystal layer is changed from an isotropic phase to a blue phase in the light irradiation. Thus, a liquid crystal display device which suppresses a defect which shows an alignment state other than a blue phase (an alignment defect) is manufactured.

20 Claims, 7 Drawing Sheets

(56) References Cited

U.S. PATENT DOCUMENTS

| | | | |
|---|---|---|---|
| 8,333,906 B2 * | 12/2012 | Schott et al. | 252/299.01 |
| 8,368,854 B2 * | 2/2013 | Nishi et al. | 349/112 |
| 2004/0160566 A1 | 8/2004 | Kawabe et al. | |
| 2005/0122465 A1 | 6/2005 | Togashi | |
| 2006/0203169 A1 | 9/2006 | Ozawa et al. | |
| 2006/0227283 A1 | 10/2006 | Ooi et al. | |
| 2007/0095468 A1 | 5/2007 | Kim et al. | |
| 2008/0259254 A1 | 10/2008 | Kikuchi et al. | |
| 2008/0266509 A1 | 10/2008 | Nishi et al. | |
| 2009/0135368 A1 * | 5/2009 | Haseba et al. | 349/183 |
| 2009/0153761 A1 | 6/2009 | Park et al. | |
| 2009/0322997 A1 | 12/2009 | Kaihoko et al. | |
| 2010/0039605 A1 | 2/2010 | Zhao et al. | |
| 2010/0296029 A1 * | 11/2010 | Yasuhiro | 349/96 |
| 2010/0326592 A1 | 12/2010 | Ishitani et al. | |

* cited by examiner

METHOD FOR MANUFACTURING LIQUID CRYSTAL DISPLAY DEVICE

BACKGROUND OF THE INVENTION

1. Field of the Invention

The present invention relates to a liquid crystal display device and a method for manufacturing the liquid crystal display device.

2. Description of the Related Art

As a display device which is thin and lightweight (a so-called flat-panel display), a liquid crystal display device including a liquid crystal element, a light-emitting device including a self-light-emitting element, a field emission display (an FED), and the like have been competitively developed.

In a liquid crystal display device, response speed of liquid crystal molecules is required to be increased. Among various kinds of display modes of a liquid crystal, a ferroelectric liquid crystal (FLC) mode, an optical compensated bend (OCB) mode, and a mode using a liquid crystal exhibiting a blue phase can be given as liquid crystal modes by which high-speed response is possible.

The blue phase is a liquid crystal phase which appears between a chiral nematic phase having a relatively short spiral pitch and an isotropic phase, and has a characteristic of an extremely high response speed. In addition, when the blue phase is used, an alignment film is not required, and a wide viewing angle is provided; therefore, the blue phase has been developed for practical use. However, the blue phase is exhibited only in a small temperature range of 1° C. to 3° C. between a cholesteric phase and an isotropic phase. Thus, there is a problem in that the temperature of the element needs to be controlled precisely.

In order to solve this problem, it is proposed that the temperature range of exhibiting the blue phase be widened by performing polymer stabilization treatment (see Patent Document 1, for example).

REFERENCE

Patent Document

[Patent Document 1] PCT International Publication No. 2005/090520

SUMMARY OF THE INVENTION

Polymer stabilization treatment is treatment performed in such a manner that a liquid crystal composition including a photocurable resin is irradiated with light and the photocurable resin is polymerized with the light so that a liquid crystal layer is stabilized. However, it is difficult to polymerize the photocurable resin uniformly over a substrate surface. When polymerization of high molecules is not uniform, alignment in a liquid crystal layer is not uniform either. Accordingly, a blue phase cannot be exhibited stably.

Thus, an object of one embodiment of the present invention is to provide a method for manufacturing a liquid crystal display device which can exhibit a blue phase stably.

According to one embodiment of the disclosed invention, when a liquid crystal display device including a liquid crystal layer which can exhibit a blue phase is manufactured, a liquid crystal composition is irradiated with light at a temperature at which the liquid crystal layer exhibits an isotropic phase and a photocurable resin included in the liquid crystal composition is polymerized, and a defect which shows an alignment state other than a blue phase (hereinafter referred to as an alignment defect) is suppressed by changing an alignment state of the liquid crystal layer from an isotropic phase to a blue phase during the light irradiation. More specifically, a manufacturing method as follows is given, for example.

One embodiment of the present invention is a method for manufacturing a liquid crystal display device comprising the steps of attaching a first substrate and a second substrate by a sealant with a liquid crystal layer comprising a liquid crystal composition interposed therebetween; performing heat treatment so as to set an alignment state of the liquid crystal layer to be an isotropic phase; and irradiating the liquid crystal layer with light so that polymer stabilization treatment is performed on the liquid crystal layer, and an alignment state of the liquid crystal layer is changed from an isotropic phase to a blue phase during the light irradiation.

Another embodiment of the present invention is a method for manufacturing a liquid crystal display device comprising the steps of forming a sealant so as to form a frame over a first substrate; dropping a liquid crystal composition inside the frame formed using the sealant; attaching a second substrate to the first substrate in a reduced-pressure atmosphere so as to form a liquid crystal layer; performing heat treatment so as to set an alignment state of the liquid crystal layer to be an isotropic phase; and irradiating the liquid crystal layer with light so that polymer stabilization treatment is performed on the liquid crystal layer, and an alignment state of the liquid crystal layer is changed from an isotropic phase to a blue phase during the light irradiation.

Another embodiment of the present invention is a method for manufacturing a liquid crystal display device comprising the steps of forming a sealant so as to form a frame over a first substrate; curing the sealant temporally by irradiating light; dropping a liquid crystal composition inside a frame formed using the sealant temporally cured; attaching a second substrate to the first substrate in a reduced-pressure atmosphere so as to form a liquid crystal layer; performing heat treatment so as to set an alignment state of the liquid crystal layer to be an isotropic phase; and irradiating the liquid crystal layer with light so that the sealant is fully cured, polymer stabilization treatment is performed on the liquid crystal layer, and an alignment state of the liquid crystal layer is changed from an isotropic phase to a blue phase during the light irradiation.

Another embodiment of the present invention is a method for manufacturing a liquid crystal display device comprising the steps of forming a sealant so as to form a frame over a first substrate; dropping a liquid crystal composition inside a frame formed using the sealant; curing the sealant temporally by irradiating light; attaching a second substrate to the first substrate in a reduced-pressure atmosphere so as to form a liquid crystal layer; performing heat treatment so as to set an alignment state of the liquid crystal layer to be an isotropic phase; and irradiating the liquid crystal layer with light so that the sealant is fully cured, polymer stabilization treatment is performed on the liquid crystal layer, and an alignment state of the liquid crystal layer is changed from an isotropic phase to a blue phase during the light irradiation.

In the above method for manufacturing a liquid crystal display device, as a liquid crystal composition, a composition comprising a liquid crystal material, a chiral agent, a photocurable resin, and a photopolymerization initiator can be used.

According to an embodiment of the disclosed invention, a material which exhibits a blue phase at a given temperature range is used as the liquid crystal composition. The material exhibiting a blue phase is capable of high-speed response. Thus, a high-performance liquid crystal display device can be achieved.

Note that a liquid crystal display device in this specification means an image display device, a display device, or a light source (including a lighting device). Further, the liquid crystal display device includes any of the following modules in its category: a module to which a connector such as an FPC (flexible printed circuit), TAB (tape automated bonding) tape, or a TCP (tape carrier package) is attached; a module having TAB tape or a TCP which is provided with a printed wiring board at the end thereof; or a module having an IC (integrated circuit) directly mounted on a substrate provided with a display element by a COG (chip on glass) method.

According to one embodiment of the disclosed invention, a highly reliable liquid crystal display device which can exhibit a blue phase stably can be manufactured. Further, yield in manufacture of the liquid crystal display device can be improved.

BRIEF DESCRIPTION OF THE DRAWINGS

In the accompanying drawings.

DETAILED DESCRIPTION OF THE INVENTION

Embodiments of the present invention will be described in detail below with reference to the accompanying drawings. Note that the present invention is not limited to the following description of the embodiments, and it is readily appreciated by those skilled in the art that modes and details of the present invention can be modified in a variety of ways without departing from the scope and spirit of the present invention. Accordingly, the present invention should not be interpreted as being limited to the following description of the embodiments. Further, structures according to different embodiments and examples can be implemented in combination as appropriate. Note that in the structure of the present invention described below, reference numerals indicating the same portions and portions having a similar function are used in common in different drawings, and repeated descriptions thereof are omitted.
(Embodiment 1)
In this embodiment, an example of a method for manufacturing a liquid crystal display device is described with reference to drawings. In this embodiment, a method for manufacturing one liquid crystal display device from a pair of substrates is shown; however, without limitation thereto, this embodiment can also be applied in the case where a plurality of liquid crystal display devices is manufactured over a large-sized substrate (obtaining a plurality of panels).

Figure 1A:
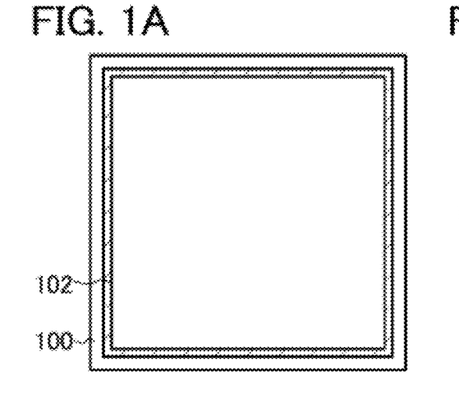
FIGS. 1A to 1E are diagrams illustrating an example of manufacturing steps of a liquid crystal display device.

First, a first substrate 100 is prepared and a sealant 102 is formed over the first substrate 100 (see FIG. 1A).

As the first substrate 100, glass substrates used for electronics industry (also called a "non-alkali glass substrate") such as an aluminosilicate glass substrate, an aluminoborosilicate glass substrate, or a barium borosilicate glass substrate; a quartz substrate; a ceramic substrate; a plastic substrate; an SOI substrate; or the like can be used. An element such as a transistor for forming a pixel and the like of a liquid crystal display device may be provided over such a substrate.

As the sealant 102, a photocurable resin, a thermosetting resin, a photocurable and thermosetting resin, or the like is preferably used. For example, an acrylic-based resin, an epoxy-based resin, an acrylate-based (urethane acrylate) resin, an amine-based resin, or a resin in which an acrylic-based resin and an epoxy-based resin are mixed can be used. Further, a photopolymerization initiator (typically, an ultraviolet light polymerization initiator), a thermosetting agent, a filler, or a coupling agent may be included in the sealant 102. Note that a photocurable resin is cured by light irradiation and a thermosetting resin is cured by heat treatment. A photocurable and thermosetting resin is temporally cured (pre-cured) by light irradiation and then fully cured by heat treatment.

The sealant 102 may be formed so as to form a frame (closed-loop shape). In FIG. 1A, a case where the sealant 102 is formed so as to form a frame with a rectangular shape is described. Note that the frame shape of the sealant 102 is not limited to the rectangular shape, and the sealant 102 may be formed so as to form a frame with a circular shape, an elliptical shape, a polygonal shape other than a rectangular shape, or the like.

Figure 1B:
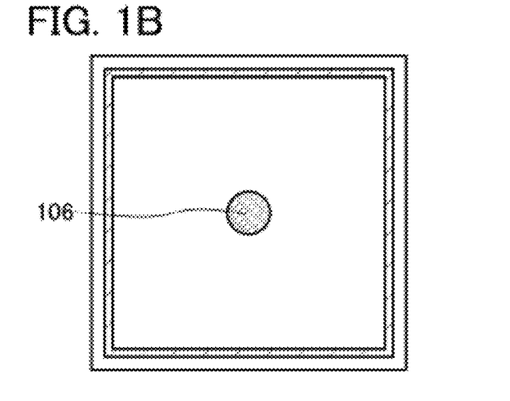

Next, a liquid crystal composition 106 is dropped on the first substrate 100 and inside the sealant 102 (inside the frame of the sealant 102) (see FIG. 1B).

As the liquid crystal composition 106, a liquid crystal composition which exhibits a blue phase can be used. The liquid crystal composition which exhibits a blue phase includes a liquid crystal material, a chiral agent, a photocurable resin, and a photopolymerization initiator. Note that the liquid crystal composition which exhibits a blue phase does not need to exhibit a blue phase at the time when the liquid crystal composition is dropped on the first substrate 100, and the liquid crystal composition which exhibits a blue phase only needs to exhibit a blue phase at a given temperature by control of the temperature.

As the liquid crystal, a thermotropic liquid crystal, a low-molecular liquid crystal, a high-molecular liquid crystal, a ferroelectric liquid crystal, an anti-ferroelectric liquid crystal, or the like can be used.

The chiral agent is employed to cause twists of the liquid crystal materials, to align the liquid crystal materials in a helical structure, and to make the liquid crystal materials exhibit a blue phase. For the chiral agent, a compound having an asymmetric center is used in which a compatibility with a liquid crystal composition is high and the twisting power is strong. Further, the chiral agent is an optically active substance, and the optical purity of which is preferably higher and the optical purity higher than or equal to 99% is preferred the most.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin that is polymerized with light having a wavelength with which the photopolymerization initiator to be used for the liquid crystal composition reacts may be selected as the photocurable resin, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

Note that FIG. 1B illustrates a case where one droplet of the liquid crystal composition 106 is dropped inside the sealant 102. However, the manufacturing method of a liquid crystal display device of this embodiment is not to be limited to this method, an appropriate amount of the liquid crystal composition 106 may be dropped; for example, a plurality of droplets of the liquid crystal composition 106 may be dropped at appropriate places inside the sealant 102.

Figure 1C:
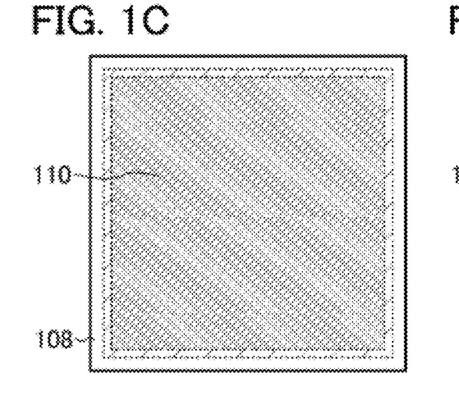

Next, the first substrate 100 and a second substrate 108 are attached to each other (see FIG. 1C). The first substrate 100 and the second substrate 108 are fixed in place by the sealant 102.

When the first substrate 100 and the second substrate 108 are attached to each other, the dropped liquid crystal composition 106 spreads over inside the frame of the sealant 102; thus, a liquid crystal layer 110 is formed. The viscosity of the liquid crystal composition 106 is high because the liquid crystal composition 106 includes a chiral agent. Accordingly, the liquid crystal layer 110 does not necessarily spread over the entire surface inside the frame of the sealant 102 (the liquid crystal layer 110 is not necessarily in contact with the sealant 102) at the stage of attaching the first substrate 100 and the second substrate 108.

As the second substrate 108, the same material as the first substrate 100 can be used.

In addition, the first substrate 100 and the second substrate 108 are preferably attached to each other in a reduced-pressure atmosphere. When the substrates are attached to each other in a reduced-pressure atmosphere, even if the substrates are exposed to the atmosphere after the attachment, the inside of the frame of the sealant 102 can be kept under reduced pressure and the liquid crystal composition 106 can finally spread to be in contact with the sealant 102.

Note that after the sealant 102 is formed over the first substrate 100 (after the step of FIG. 1A) or after the first substrate 100 and the second substrate 108 are attached (after the step of FIG. 1C), the sealant 102 may be temporally cured through light irradiation or heat treatment. By curing temporally on the sealant 102, misalignment of the substrate due to thermal distortion can be prevented in a later heat treatment step. Further, the liquid crystal composition 106 can be prevented from leaking outside (outside the frame) flowing over the sealant because adhesion between the sealant 102 and the substrates (the first substrate 100 and the second substrate 108) is improved. By curing temporally on the sealant 102 before dropping the liquid crystal composition 106, mixture of an impurity into the liquid crystal composition 106 from the sealant 102 can be suppressed when the liquid crystal composition 106 is in contact with the sealant 102.

Figure 1D:
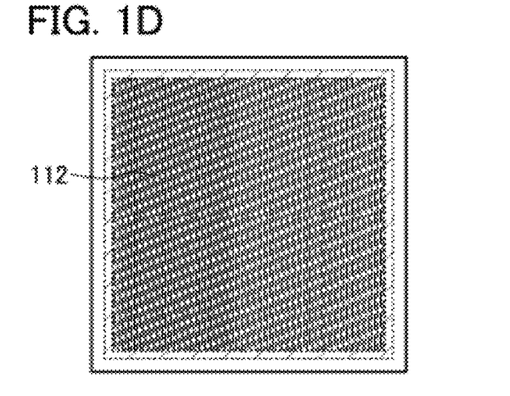

Next, heat treatment is performed on the liquid crystal layer 110 interposed between the first substrate 100 and the second substrate 108, and the liquid crystal layer 110 becomes a liquid crystal layer 112 exhibiting an isotropic phase by the heat treatment (see FIG. 1D). The temperature of the heat treatment may be higher than a temperature at which the liquid crystal composition constituting the liquid crystal layer can exhibit the isotropic phase, and a stage having a heat source such as a heater may be used as the heating means, and the substrate may be arranged thereover. A dropping mark is sometimes formed on the first substrate 100 when the liquid crystal composition is dropped. However, setting the temperature of the liquid crystal composition to be higher than a phase transition temperature between a blue phase and an isotropic phase by 10° C. or more is preferable, because the dropping mark can be eliminated and alignment disorder of the liquid crystal layer due to the dropping mark can be prevented. Note that the phase transition temperature between a blue phase and an isotropic phase refers to a temperature at which the phase transfers from a blue phase to an isotropic phase when the temperature is raised, or a temperature at which the phase transfers from an isotropic phase to a blue phase when the temperature is decreased.

After that, polymer stabilization treatment is performed on the liquid crystal layer 112 exhibiting an isotropic phase so that polymerization of the photocurable resin included in the liquid crystal composition 106 is performed, while the liquid crystal composition 106 exhibits a blue phrase. Thus, a liquid crystal layer 114 exhibiting a blue phrase is formed (see FIG. 1E).

The polymer stabilization treatment can be performed in such a manner that a liquid crystal composition including a liquid crystal material, a chiral agent, a photocurable resin, and a photopolymerization initiator is irradiated with light having a wavelength with which the photocurable resin and the photopolymerization initiator are reacted.

Before light irradiation (before the polymer stabilization treatment), a photocurable resin included in the liquid crystal composition is in a monomeric state, and after light irradiation, the photocurable resin is gradually changed in a polymer state by polymerization. The phase transition temperature between a blue phase and an isotropic phase is affected by a photocurable resin in a monomeric state, in addition to the liquid crystal material in the liquid crystal composition, while the temperature is not easily affected by a photocurable resin in a polymer state. Therefore, as the ratio of a photocurable resin in a polymer state included in the liquid crystal composition increases by light irradiation, the phase transition temperature between a blue phase and an isotropic phase increases (or decreases) linearly. In general, by including a photocurable resin in a monomeric state, the phase transition temperature between a blue phase and an isotropic phase decreases.

The liquid crystal composition in this embodiment is adjusted so that the phase transition temperature between a blue phase and an isotropic phase decreases by including the photocurable resin in a monomeric state as compared to the case of including only a liquid crystal material and a chiral agent. Thus, by increasing the photocurable resin in a polymer state by light irradiation, the phase transition temperature between a blue phase and an isotropic phase of the liquid crystal composition increases.

Figure 2:
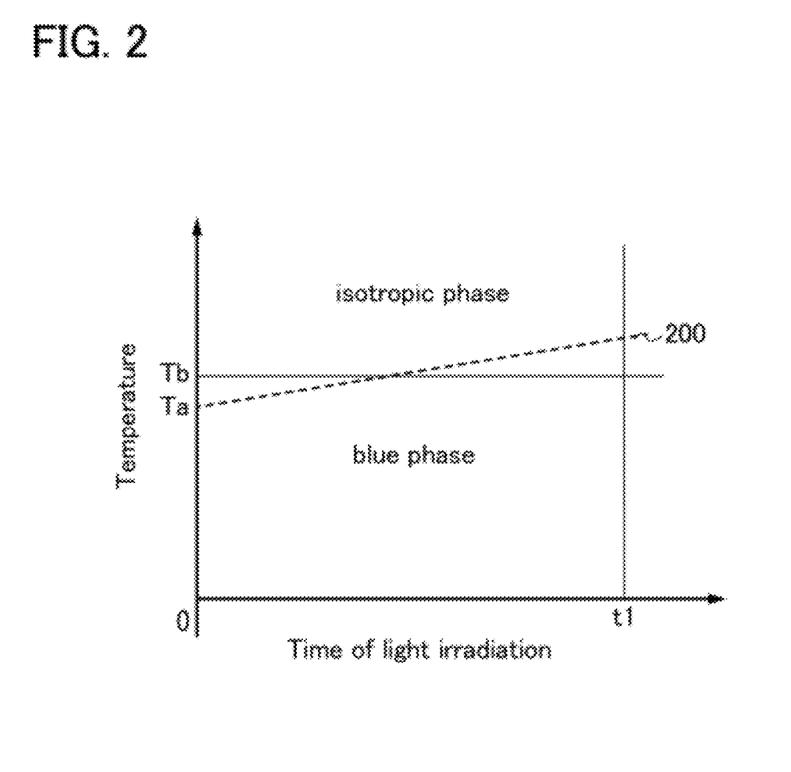
FIG. 2 is a model diagram illustrating an alignment state of a liquid crystal composition.

In FIG. 2, a model diagram of an alignment state of the liquid crystal composition used in this embodiment is illustrated. In FIG. 2, the horizontal axis indicates the time of light irradiation performed on the liquid crystal composition, and the vertical axis indicates the temperature of the liquid crystal composition. Further, a dashed line 200 indicates the phase transition temperature between a blue phase and an isotropic phase. Furthermore, in FIG. 2, Ta indicates the phase transition temperature between a blue phase and an isotropic phase of the liquid crystal composition before light irradiation.

In the manufacturing method of the liquid crystal display device shown in this embodiment, the polymer stabilization treatment is performed, in which light irradiation is performed on the liquid crystal layer 112 exhibiting an isotropic phase, that is, a liquid crystal layer having higher temperature than Ta, and a phase change from an isotropic phase to a blue phase is performed during the light irradiation treatment. As described above, in the liquid crystal composition used in this embodiment, the phase transition temperature between a blue phase and an isotropic phase of the liquid crystal composition increases by increasing the photocurable resin in a polymer state by light irradiation. Thus, for example, in the case of irradiating a liquid crystal layer having temperature Tb with light for t1 hours, the phase transition temperature between a blue phase and an isotropic phase indicated by the dashed line 200 also increases by light irradiation as shown in FIG. 2. Therefore, when light irradiation is performed with the temperature of the liquid crystal layer kept Tb, the liquid crystal layer 114 exhibiting a blue phase can be formed in termination of light irradiation (t1 hours later). Like this, in the manufacturing method of the liquid crystal display device in this embodiment, it is possible that the polymerization of the photocurable resin and the phase transition from an isotropic phase to a blue phase are performed concurrently (through the same step).

In the case where the polymer stabilization treatment is started on the liquid crystal layer exhibiting a blue phase, a region where distortion of stress or the like is concentrated due to volume shrinkage by the phase transition is formed at the time of an exhibition of a blue phase, so that an alignment defect is generated in the region at the time of the light irradiation in some cases. However, as shown in this embodiment, by performing the exhibition of a blue phase and the polymer stabilization treatment (in other words, the polymerization of the photocurable resin) concurrently, distortion by volume shrinkage is dispersed over the entire surface of the substrate, so that the alignment defect can be suppressed.

In the case where the polymer stabilization treatment is started on the liquid crystal layer exhibiting a blue phase, before the polymer stabilization treatment, the liquid crystal layer is heated to exhibit an isotropic phase for realignment, and the temperature of the liquid crystal layer is gradually decreased so that the phase changes to a blue phase. Here, when the temperature of the liquid crystal layer is gradually decreased, it is necessary to control the temperature precisely to suppress the alignment defect. However, in the manufacturing method of the liquid crystal display device in this embodiment, the polymer stabilization treatment can be performed on the liquid crystal composition heated to exhibit the isotropic phase, without complicated control of temperature, so that simplification of the steps can be realized and yield can be increased. Moreover, if necessary, the liquid crystal layer can be rapidly cooled in the temperature range in which an isotropic phase is exhibited after the liquid crystal composition is heated to exhibit the isotropic phase, so that throughput in manufacture of the liquid crystal display device is also improved.

Figure 1E:
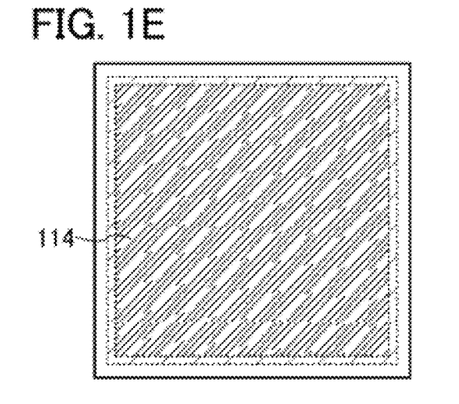

After the polymer stabilization treatment, cure treatment of the sealant 102 is performed. Cure treatment may be set as appropriate in accordance with the material of the sealant. For example, when a thermosetting resin is used for the sealant 102, heat treatment is performed to cure the sealant 102. Alternatively, when a photocurable resin is used for the sealant 102, the sealant 102 is cured by irradiating the photocurable resin with light having a wavelength with which the photocurable resin is reacted. Note that when the sealant 102 is temporally cured after the sealant 102 is formed over the first substrate 100 or after the first substrate 100 and the second substrate 108 are attached to each other, the sealant 102 can be fully cured by this cure treatment.

In the case where a photocurable resin is used for the sealant 102, the sealant 102 may be cured (or fully cured) at the same time in the step of light irradiation in the polymer stabilization treatment. Alternatively, in the case where a thermosetting resin is used for the sealant 102, the sealant 102 may be cured (or fully cured) in the heat treatment for exhibiting an isotropic phase. In this case, the cure treatment step can be reduced; thus, the manufacturing process can be simplified.

Note that, although not illustrated, an optical film such as a polarizing plate, a retardation plate and an anti-reflection film or the like is provided in the liquid crystal display device as appropriate. For example, circular polarization by the polarizing plate and the retardation plate may be used. In addition, a backlight, a side light, or the like may be used as a light source.

In this specification, in the case where the liquid crystal display device is a transmissive liquid crystal display device in which display is performed by transmission of light from a light source (or a semi-transmissive liquid crystal display device), it is necessary that light be transmitted at least in a pixel region. Therefore, the first substrate, the second substrate, or thin films provided over the first substrate or the second substrate such as an insulating film and a conductive film which are present in the pixel region through which light is transmitted all have a light-transmitting property with respect to light in the visible-light wavelength range.

An electrode layer (referred to as a pixel electrode layer, a common electrode layer, a counter electrode layer, or the like) for applying voltage to the liquid crystal layer preferably has a light-transmitting property; however, a non-light-transmitting material such as a metal film may be used depending on a pattern of the electrode layer.

The electrode layer serving as a pixel electrode layer or a counter electrode layer can be formed using one or a plurality of the following: indium tin oxide (ITO), a conductive material in which zinc oxide (ZnO) is mixed into indium oxide, a conductive material in which silicon oxide ($SiO_2$) is mixed into indium oxide, organic indium, organic tin, indium oxide containing tungsten oxide, indium zinc oxide containing tungsten oxide, indium oxide containing titanium oxide, indium tin oxide containing titanium oxide, or graphene; or metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminium (Al), copper (Cu), or silver (Ag), or alloy or nitride of any of those metals.

Further, the electrode layer can be formed using a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm.

As the conductive macromolecule, a so-called π-electron conjugated conductive macromolecule can be used. For example, polyaniline or a derivative thereof, polypyrrole or a derivative thereof, polythiophene or a derivative thereof, a copolymer of two or more kinds of aniline, pyrrole, or thiophene or a derivative thereof, and the like can be given.

Through the above process, a liquid crystal display device in this embodiment can be manufactured. The liquid crystal display device manufactured using the manufacturing method shown in this embodiment is a highly reliable liquid crystal display device in which the alignment defect is suppressed and a blue phase can be exhibited stably. Further, by application of this embodiment, yield in manufacture of the liquid crystal display device can be improved.

Note that this embodiment can be implemented in combination with any of the description of other embodiments as appropriate.

(Embodiment 2)

In this embodiment, an example of the liquid crystal display device which is manufactured in Embodiment 1 is described with reference to drawings.

Figure 3A:
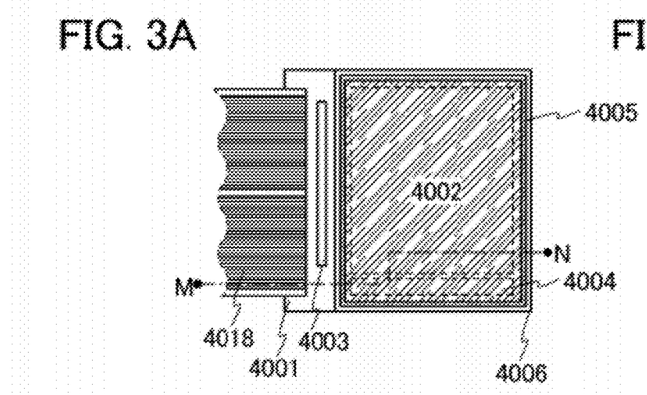
FIGS. 3A, 3B, and 3C are diagrams illustrating a structural example of a liquid crystal display device.
Figure 3B:
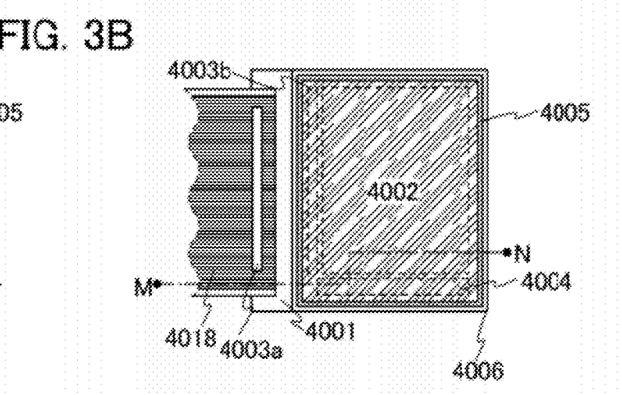
Figure 3C:
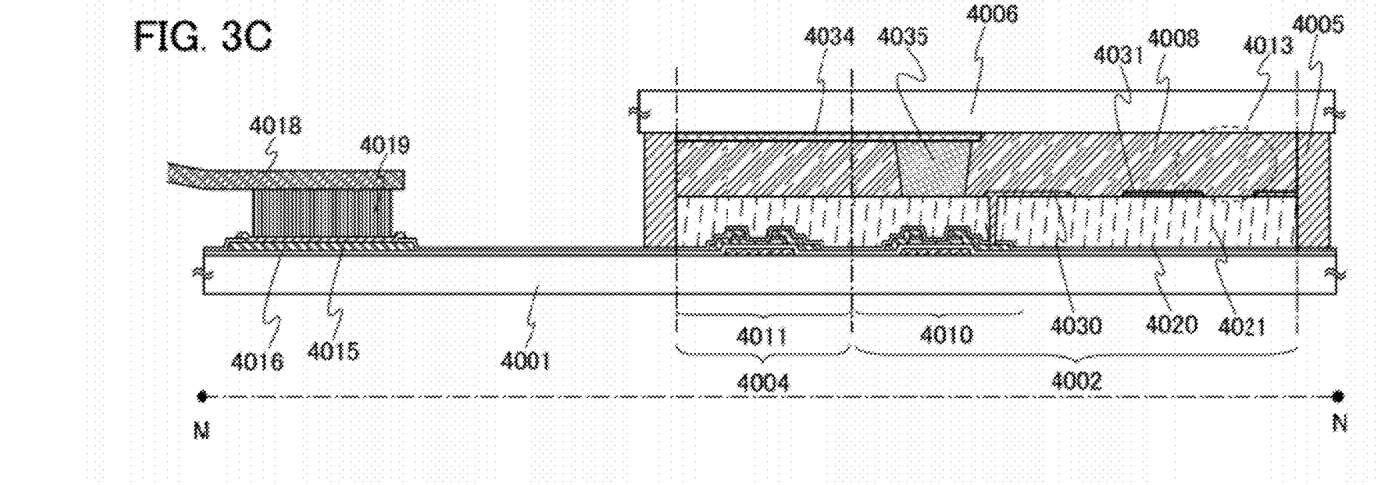

FIGS. 3A and 3B are top views of panels in which transistors 4010 and 4011 and a liquid crystal element 4013 which are formed over a first substrate 4001 are sealed between the first substrate 4001 and a second substrate 4006 with a sealant 4005. FIG. 3C is a cross-sectional view taken along line M-N of FIGS. 3A and 3B.

The sealant 4005 is provided so as to surround a pixel portion 4002 and a scan line driver circuit 4004 which are provided over the first substrate 4001. In addition, the second substrate 4006 is provided over the pixel portion 4002 and the scan line driver circuit 4004. The pixel portion 4002 and the scan line driver circuit 4004 are sealed between the first substrate 4001 and the second substrate 4006 with the sealant 4005 together with a liquid crystal layer 4008 which exhibits a blue phase.

In FIG. 3A, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. Note that FIG. 3B illustrates an example in which part of a signal line driver circuit is formed over the first substrate 4001 with the use of a transistor which includes an oxide semiconductor. A signal line driver circuit 4003b is formed over the first substrate 4001 and a signal line driver circuit 4003a which is formed using a single crystal semiconductor film or a polycrystalline semiconductor film is mounted on the substrate separately prepared.

Note that there is no particular limitation on the connection method of a driver circuit which is separately formed, and a COG method, a wire bonding method, a TAB method, or the like can be used. FIG. 3A illustrates an example of mounting the signal line driver circuit 4003 by a COG method, and FIG. 3B illustrates an example of mounting the signal line driver circuit 4003a by a TAB method.

The pixel portion 4002 and the scan line driver circuit 4004 provided over the first substrate 4001 include a plurality of transistors. FIG. 3C illustrates the transistor 4010 included in the pixel portion 4002 and the transistor 4011 included in the scan line driver circuit 4004, as an example. An insulating layers 4020 and 4021 are provided over the transistors 4010 and 4011.

Various kinds of transistors can be applied to the transistors 4010 and 4011 without particular limitation. A semiconductor formed using silicon (for example, amorphous silicon, microcrystalline silicon, or polysilicon) or the like or an oxide semiconductor can be used for a channel layer of each of the transistors 4010 and 4011.

In addition, a pixel electrode layer 4030 and a common electrode layer 4031 are provided over the first substrate 4001, and the pixel electrode layer 4030 is electrically connected to the transistor 4010. The liquid crystal element 4013 includes the pixel electrode layer 4030, the common electrode layer 4031, and the liquid crystal layer 4008.

In a liquid crystal display device including the liquid crystal layer 4008 which exhibits a blue phase, a method in which the gray scale is controlled by generating an electric field generally parallel (i.e., in a lateral direction) to a substrate to move liquid crystal molecules in a plane parallel to the substrate can be used. For such a method, an electrode structure used in plane switching (IPS) mode illustrated in FIG. 3C is employed in this embodiment. Note that without limitation to an IPS mode, an electrode structure used in a fringe field switching (FFS) mode can also be employed.

As the first substrate 4001 and the second substrate 4006, glass, plastic, or the like having a light-transmitting property can be used. As plastic, polyether sulfone (PES), polyimide, a fiberglass-reinforced plastic (FRP) plate, a polyvinyl fluoride (PVF) film, a polyester film, or an acrylic resin film can be used. In addition, a sheet with a structure in which an aluminum foil is sandwiched between PVF films or polyester films can be used.

Furthermore, a columnar spacer 4035 which is provided in order to control the thickness (a cell gap) of the liquid crystal layer 4008 can be obtained by selective etching of an insulating film. Note that a spherical spacer may be used instead of the columnar spacer 4035.

In FIG. 3C, a light-blocking layer 4034 is provided on the second substrate 4006 side so as to cover the transistors 4010 and 4011. With provision of the light-blocking layer 4034, the advantageous effect of stabilizing the transistors can be increased. The light-blocking layer 4034 may be provided on the first substrate 4001 side. In this case, when polymer stabilization is performed by irradiation with light from the second substrate 4006 side, a photocurable resin included in a liquid crystal composition over the light-blocking layer 4034 can also be polymerized.

In case of providing the light-blocking layer 4034 on the first substrate 401 side, the light-blocking layer 4034 may be covered with the insulating layer 4020 which functions as a protective film of the transistors; however, there is no particular limitation.

Note that the protective film is provided to prevent entry of contaminant impurities floating in the air, such as an organic substance, a metal substance, or moisture, and is preferably a dense film. The protective film may be formed by a sputtering method to have a single-layer structure or a stacked-layer structure including any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

After the protective film is formed, heat treatment may be performed on the semiconductor layer at 300° C. to 400° C.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (ITO), indium zinc oxide, indium tin oxide to which silicon oxide is added, or graphene.

A conductive composition containing a conductive high-molecular (also referred to as a conductive polymer) can also be used for each of the pixel electrode layer 4030 and the common electrode layer 4031.

Further, a variety of signals and potentials are supplied, from an FPC 4018, to the signal line driver circuit 4003 which is formed separately, the scan line driver circuit 4004, or the pixel portion 4002.

Furthermore, since the transistor is easily broken by static electricity and the like, a protection circuit for protecting the driver circuits is preferably provided over the same substrate for a gate line or a source line. The protection circuit is preferably formed using a nonlinear element in which an oxide semiconductor is used.

In FIG. 3C, a connection terminal electrode 4015 is formed using the same conductive film as the pixel electrode layer 4030, and a terminal electrode 4016 is formed using the same conductive film as the source and drain electrode layers of the transistors 4010 and 4011.

The connection terminal electrode 4015 is electrically connected to a terminal included in the FPC 4018 through an anisotropic conductive film 4019.

Although FIGS. 3A, 3B, and 3C illustrate an example in which the signal line driver circuit 4003 is formed separately and mounted on the first substrate 4001, this embodiment is not limited to such a structure. The scan line driver circuit may be formed separately and then mounted, or only part of the signal line driver circuit or part of the scan line driver circuit may be formed separately and then mounted.

Note that there is no particular limitation on a structure of a transistor which can be applied to a liquid crystal display device disclosed in this specification. For example, a top-gate staggered structure, a top-gate planar structure, a bottom-gate staggered structure, a bottom-gate planar structure, or the like can be used. The transistor may have a single-gate structure in which one channel region is formed, a double-gate structure in which two channel formation regions are formed, or a triple-gate structure in which three channel formation regions are formed. Alternatively, the transistor may have a dual gate structure including two gate electrode layers positioned over and below a channel region with a gate insulating layer provided therebetween.

Figure 4:
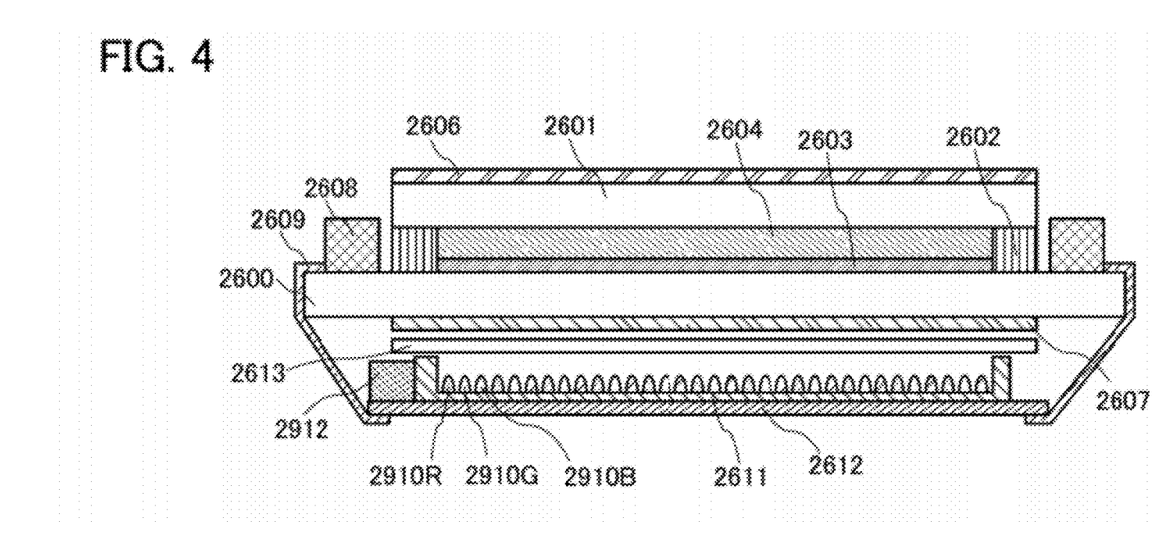
FIG. 4 is a diagram illustrating a structural example of a liquid crystal display device.

FIG. 4 illustrates an example of a cross-sectional structure of a liquid crystal display device in which an element substrate 2600 and a counter substrate 2601 are attached to each other with a sealant 2602, and an element layer 2603 including a transistor or the like and a liquid crystal layer 2604 are provided between the substrates.

In the case where color display is performed, light-emitting diodes which emit light of plural colors are arranged in a backlight portion. In the case of an RGB system, a red light-emitting diode 2910R, a green light-emitting diode 2910G, and a blue light-emitting diode 2910B are disposed in each of a plurality of regions into which a display area of the liquid crystal display device is divided.

A polarizing plate 2606 is provided on the outer side of the counter substrate 2601, and a polarizing plate 2607 and an optical sheet 2613 are provided on the outer side of the element substrate 2600. A light source is formed using the red light-emitting diode 2910R, the green light-emitting diode 29106, the blue light-emitting diode 2910B, and a reflective plate 2611. An LED control circuit 2912 provided over a circuit substrate 2612 is connected to a wiring circuit portion 2608 provided over the element substrate 2600 through a flexible wiring substrate 2609 and further provided with an external circuit such as a control circuit or a power source circuit.

The LEDs are individually made to emit light by the LED control circuit 2912; thus, a field-sequential liquid crystal display device can be realized.

This embodiment can be implemented in combination with any of the structures described in the other embodiments as appropriate.

(Embodiment 3)

There is no particular limitation on the semiconductor material used for the semiconductor layer of the transistor included in the liquid crystal display device disclosed in this specification. In this embodiment, an example of a material which can be used for any of the semiconductor layers of the transistors will be described.

A semiconductor layer included in a semiconductor element can be formed using any of the following materials: an amorphous semiconductor (hereinafter also referred to as an "AS") formed by a vapor deposition method using a semiconductor material gas typified by silane or germane or by a sputtering method; a polycrystalline semiconductor formed by crystallizing the amorphous semiconductor by utilizing light energy or thermal energy; a microcrystalline (also referred to as semiamorphous) semiconductor (hereinafter also referred to as a "SAS"); and the like. The semiconductor layer can be formed by a sputtering method, an LPCVD method, a plasma CVD method, or the like.

A microcrystalline semiconductor film belongs to a metastable state which is an intermediate state between amorphous and single crystal when Gibbs free energy is considered. In other words, the microcrystalline semiconductor film is a semiconductor having a third state which is stable in terms of free energy and has a short-range order and lattice distortion. Columnar-like or needle-like crystals grow in a normal direction with respect to a substrate surface. The Raman spectrum of microcrystalline silicon, which is a typical example of a microcrystalline semiconductor, shifts to the lower wavenumber side than 520 cm$^{-1}$ which represents single crystal silicon. That is, the peak of the Raman spectrum of the microcrystalline silicon exists between 520 cm$^{-1}$ which represents single crystal silicon and 480 cm$^{-1}$ which represents amorphous silicon. The microcrystalline semiconductor film includes hydrogen or halogen of at least 1 at. % or more to terminate a dangling bond. Moreover, a rare gas element such as helium, argon, krypton, or neon may be included to further promote lattice distortion, so that stability is enhanced and a favorable microcrystalline semiconductor film can be obtained.

This microcrystalline semiconductor film can be formed by a high-frequency plasma CVD method with a frequency of several tens of MHz to several hundreds of MHz or a microwave plasma CVD apparatus with a frequency of 1 GHz or more. The microcrystalline semiconductor film can be typically formed using a dilution of silicon hydride such as $SiH_4$, $Si_2H_6$, $SiH_2Cl_2$, $SiHCl_3$, $SiCl_4$, or $SiF_4$ with hydrogen. With a dilution with one kind or plural kinds of rare gas elements selected from helium, argon, krypton, and neon in addition to silicon hydride and hydrogen, the microcrystalline semiconductor film can be formed. In that case, the flow rate ratio of hydrogen to silicon hydride is set to be 5:1 to 200:1, preferably, 50:1 to 150:1, more preferably, 100:1.

As a typical amorphous semiconductor, hydrogenated amorphous silicon can be given. As a typical crystalline semiconductor, polysilicon and the like can be given. Polysilicon (polycrystalline silicon) includes so-called high-temperature polysilicon that uses polysilicon as a main material and is formed at a process temperature higher than or equal to 800° C., so-called low-temperature polysilicon that uses polysilicon as a main material and is formed at a process temperature lower than or equal to 600° C., and polysilicon obtained by crystallizing amorphous silicon with the use of an element or the like that promotes crystallization, and the like. Needless to say, as described above, a microcrystalline semiconductor or a semiconductor which includes a crystal phase in part of the semiconductor layer can also be used.

As a material of the semiconductor, as well as an element such as silicon (Si) or germanium (Ge), a compound semiconductor such as GaAs, InP, SiC, ZnSe, GaN, or SiGe can be used.

In the case of using a crystalline semiconductor film for the semiconductor layer, the crystalline semiconductor film may be formed by various methods (such as a laser crystallization method, a thermal crystallization method, or a thermal crystallization method using an element such as nickel which promotes crystallization). Alternatively, a microcrystalline semiconductor which is a SAS can be crystallized by laser irradiation to improve the crystallinity. When the element that promotes crystallization is not introduced, before laser light irradiation on an amorphous silicon film, the amorphous silicon film is heated at 500° C. for one hour under a nitrogen atmosphere to release hydrogen contained therein so that the concentration of hydrogen is $1\times10^{20}$ atoms/cm$^3$ or less. This is because the amorphous silicon film containing a large amount of hydrogen is destroyed when being irradiated with laser light.

There is no particular limitation on a method for introducing a metal element into the amorphous semiconductor film as long as the method is capable of making the metal element exist on the surface of or inside the amorphous semiconductor film. For example, a sputtering method, a CVD method, a plasma treatment method (including a plasma CVD method), an adsorption method, or a method for applying a solution of metal salt can be employed. Among these methods, the method using a solution is convenient and has an advantage in that the concentration of the metal element can be easily controlled. At this time, it is desirable to form an oxide film by UV light irradiation in an oxygen atmosphere, a thermal oxidation method, treatment with ozone water containing hydroxyl radical or hydrogen peroxide, or the like in order to improve wettability of the surface of the amorphous semiconductor film so that an aqueous solution is spread over the entire surface of the amorphous semiconductor film.

In a crystallization step in which an amorphous semiconductor film is crystallized to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element which promotes (accelerates) crystallization, one kind or plural kinds selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element which promotes crystallization from the crystalline semiconductor film, a semiconductor film containing an impurity element is formed in contact with the crystalline semiconductor film so as to function as a gettering sink. The impurity element may be an impurity element imparting n-type conductivity, an impurity element imparting p-type conductivity, a rare gas element, or the like. For example, one kind or plural kinds selected from phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor film containing a rare gas element is formed in contact with the crystalline semiconductor film containing the element which promotes crystallization, and heat treatment (at 550° C. to 750° C. for 3 minutes to 24 hours) is performed. The element which promotes crystallization contained in the crystalline semiconductor film moves into the semiconductor film containing a rare gas element, and thus the element which promotes crystallization contained in the crystalline semiconductor film is removed or reduced. After that, the semiconductor film containing a rare gas element that has served as a gettering sink is removed.

An amorphous semiconductor film may be crystallized by a combination of heat treatment and laser light irradiation, or one of heat treatment and laser light irradiation may be performed a plurality of times.

Further, the crystalline semiconductor film may be directly formed over a substrate by a plasma method. Alternatively, the crystalline semiconductor film may be selectively formed over the substrate by a plasma method.

An oxide semiconductor may be used for the semiconductor layer. For example, zinc oxide (ZnO), tin oxide (SnO$_2$), or the like can be used. In the case of using ZnO for the semiconductor layer, Y$_2$O$_3$, Al$_2$O$_3$, TiO$_2$, a stacked layer thereof, or the like can be used for a gate insulating layer, and ITO, Au, Ti, or the like can be used for a gate electrode layer, a source electrode layer, and a drain electrode layer. In addition, In, Ga, or the like can be added to ZnO.

As the oxide semiconductor, a thin film expressed by InMO$_3$(ZnO)$_m$ (m>0) can be used. Note that M denotes one or more of metal elements selected from gallium (Ga), iron (Fe), nickel (Ni), manganese (Mn), and cobalt (Co). In addition to a case where only Ga is contained as M, there is a case where Ga and the above metal elements other than Ga, for example, Ga and Ni or Ga and Fe are contained as M. Moreover, in the above oxide semiconductor, a transition metal element such as Fe or Ni or an oxide of the transition metal is contained as an impurity element in addition to a metal element contained as M in some cases. As the oxide semiconductor layer, for example, an In—Ga—Zn—O-based non-single-crystal film can be used.

As the oxide semiconductor layer (the InMO$_3$(ZnO)$_m$ (m>0) film), an InMO$_3$(ZnO)$_m$ (m>0) film in which M is another metal element may be used instead of the In—Ga—Zn—O-based non-single-crystal film.

This embodiment can be implemented in combination with any of the structures described in the other embodiments as appropriate.

(Embodiment 4)

A liquid crystal display device disclosed in this specification can be applied to a variety of electronic appliances (including game machines). Examples of electronic devices are a television set (also referred to as a television or a television receiver), a monitor of a computer or the like, a camera such as a digital camera and a digital video camera, a digital photo frame, a mobile phone handset (also referred to as a mobile phone or a mobile phone device), a portable game console, a portable information terminal, an audio reproducing device, a large-sized game machine such as a pachinko machine, and the like.

Figure 5A:
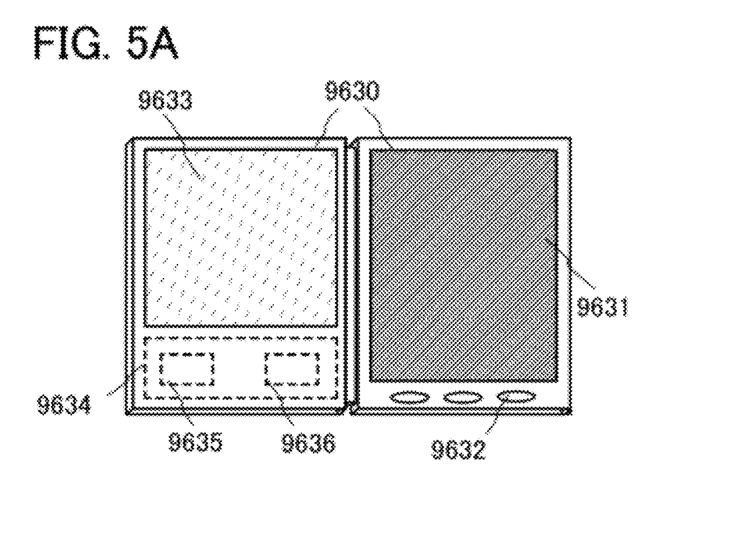
FIGS. 5A and 5B are diagrams illustrating an example of application of a liquid crystal display device.

FIG. 5A illustrates an electronic book reader (also referred to as an e-book) which can include housings 9630, a display portion 9631, operation keys 9632, a solar cell 9633, and a charge and discharge control circuit 9634. The electronic book reader illustrated in FIG. 5A can have a function of displaying various kinds of information (such as a still image, a moving image, and a text image), a function of displaying a calendar, a date, time, or the like on the display portion, a function of operating or editing the information displayed on the display portion, a function of controlling processing by various kinds of software (programs), and the like. Note that in FIG. 5A, a battery 9635 and a DCDC converter 9636 (hereinafter abbreviated to a converter) are included in the charge and discharge control circuit 9634, as an example. By using the liquid crystal display device described in any of the above embodiments for the display portion 9631, a highly reliable electronic book reader can be obtained.

In the case where a transflective liquid crystal display device or a reflective liquid crystal display device is used as the display portion 9631, use under a relatively bright condition is assumed; therefore, the structure shown in FIG. 5A is preferable because power generation by the solar cell 9633 and charge with the battery 9635 are effectively performed. Since the solar cell 9633 can be provided on a space (a surface or a rear surface) of the housing 9630 as appropriate, the battery 9635 can be efficiently charged, which is preferable. When a lithium ion battery is used for the battery 9635, there is an advantage of downsizing or the like.

Figure 5B:
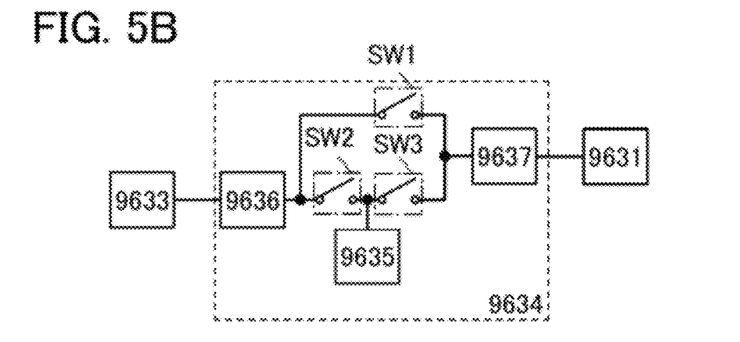

The structure and the operation of the charge and discharge control circuit 9634 illustrated in FIG. 5A will be described with reference to a block diagram in FIG. 5B. The solar cell 9633, the battery 9635, the converter 9636, a converter 9637, switches SW1 to SW3, and the display portion 9631 are illustrated in FIG. 5B, and the battery 9635, the converter 9636, the converter 9637, and the switches SW1 to SW3 correspond to the charge and discharge control circuit 9634.

First, an example of operation in the case where power is generated by the solar cell 9633 using external light is described. The voltage of power generated by the solar cell 9633 is raised or lowered by the converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and a switch SW2 is turned on so that charge of the battery 9635 may be performed.

Next, an example of operation in the case where power is not generated by the solar cell 9633 utilizing external light is described. The voltage of power accumulated in the battery 9635 is raised or lowered by the converter 9637 by turning on the switch SW3. Then, power from the battery 9635 is used for the operation of the display portion 9631.

Note that although the solar cell 9633 is described as an example of a means for charge, charge of the battery 9635 may be performed with another means. In addition, a combination of the solar cell 9633 and another means for charge may be used.

Figure 6A:
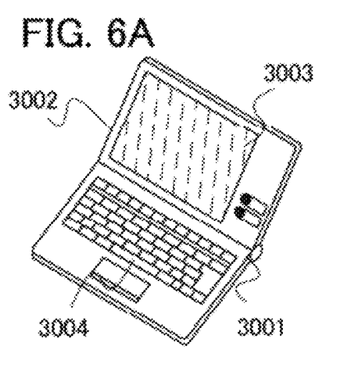
FIGS. 6A to 6F are diagrams illustrating examples of application of a liquid crystal display device.

FIG. 6A illustrates a laptop personal computer including a main body 3001, a housing 3002, a display portion 3003, a keyboard 3004, and the like. By using the liquid crystal display device described in the above embodiment for the display portion 3003, a highly reliable laptop personal computer can be obtained.

Figure 6B:
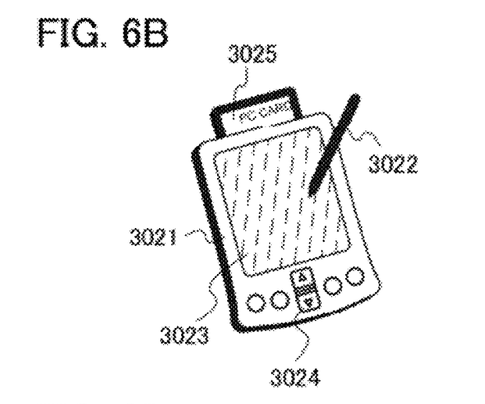

FIG. 6B illustrates a personal digital assistant (PDA) including a display portion 3023, an external interface 3025, an operation button 3024, and the like in a main body 3021. A stylus 3022 is included as an accessory for operation. By using the liquid crystal display device described in the above embodiment for the display portion 3023, a highly reliable personal digital assistant (PDA) can be obtained.

Figure 6C:
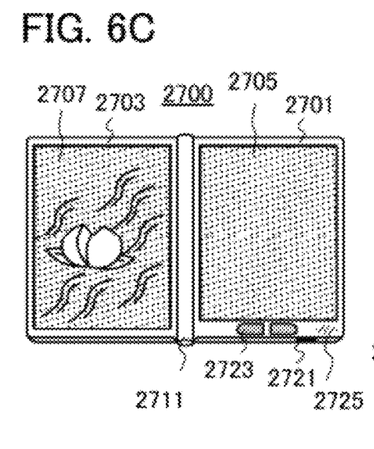

FIG. 6C illustrates an example of an electronic book reader. For example, the electronic book reader 2700 includes two housings, a housing 2701 and a housing 2703. The housing 2701 and the housing 2703 are combined with a hinge 2711 so that the electronic book reader can be opened and closed with the hinge 2711 as an axis. With such a structure, the electronic book reader can operate like a paper book.

A display portion 2705 and a display portion 2707 are incorporated in the housing 2701 and the housing 2703, respectively. The display portion 2705 and the display portion 2707 may display one image or different images. In the structure where different images are displayed on the display portion 2705 and the display portion 2707, for example, the right display portion (the display portion 2705 in FIG. 6C) can display text and the left display portion (the display portion 2707 in FIG. 6C) can display images. By using the liquid crystal display device described in the above embodiment for the display portion 2705 and the display portion 2707, a highly reliable electronic book reader can be obtained.

FIG. 6C illustrates an example in which the housing 2701 is provided with an operation portion and the like. For example, the housing 2701 is provided with a power supply 2721, operation keys 2723, a speaker 2725, and the like. With the operation keys 2723, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Further, the electronic book reader 2700 may have a function of an electronic dictionary.

The electronic book reader 2700 may transmit and receive data wirelessly. Through wireless communication, desired book data or the like can be purchased and downloaded from an electronic book server.

Figure 6D:
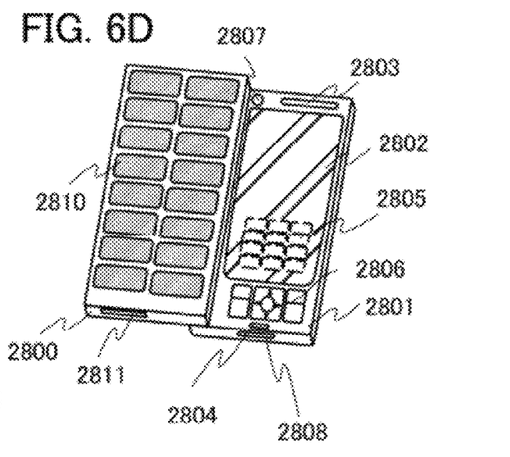

FIG. 6D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 having a function of charge of the mobile phone, an external memory slot 2811, and the like. Further, an antenna is incorporated in the housing 2801. The liquid crystal display device shown in the above embodiments can be applied to the display panel 2802, whereby a highly reliable mobile phone can be provided.

Further, the display panel 2802 is provided with a touch panel. A plurality of operation keys 2805 that are displayed as images are shown by dashed lines in FIG. 6D. Note that a boosting circuit by which a voltage output from the solar cell 2810 is increased to be sufficiently high for each circuit is also included.

In the display panel 2802, the display direction can be appropriately changed depending on a usage pattern. Further, the display device is provided with the camera lens 2807 on the same surface as the display panel 2802, and thus it can be used as a video phone. The speaker 2803 and the microphone 2804 can be used for videophone calls, recording and playing sound, and the like as well as voice calls. Further, the housings 2800 and 2801 in a state where they are developed as illustrated in FIG. 6D can shift by sliding so that one is lapped over the other; therefore, the size of the mobile phone can be reduced, which makes the mobile phone suitable for being carried.

The external connection terminal 2808 can be connected to an AC adapter and various types of cables such as a USB cable, and charging and data communication with a personal computer are possible. Moreover, a large amount of data can be stored by inserting a storage medium into the external memory slot 2811 and can be moved.

Further, in addition to the above functions, an infrared communication function, a television reception function, or the like may be provided.

Figure 6E:
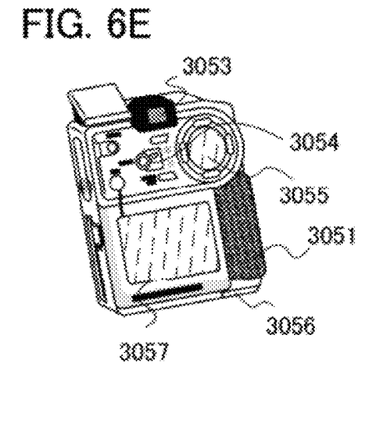

FIG. 6E illustrates a digital video camera including a main body 3051, a display portion A 3057, an eyepiece 3053, an operation switch 3054, a display portion B 3055, a battery 3056, and the like. By using the liquid crystal display device described in the above embodiment for the display portion A 3057 and the display portion B 3055, a highly reliable digital video camera can be provided.

Figure 6F:
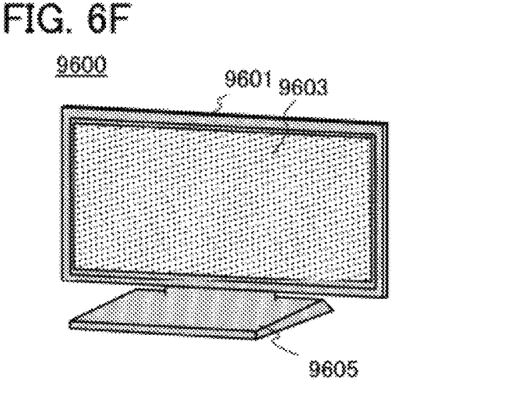

FIG. 6F illustrates an example of a television set. In the television set 9600, a display portion 9603 is incorporated in a housing 9601. The display portion 9603 can display images. Here, the housing 9601 is supported by a stand 9605. By using the liquid crystal display device described in the above embodiment for the display portion 9603, a highly reliable television set can be provided.

The television set 9600 can be operated by an operation switch of the housing 9601 or a separate remote controller. Further, the remote controller may be provided with a display portion for displaying data output from the remote controller.

Note that the television set 9600 is provided with a receiver, a modem, and the like. With the use of the receiver, general television broadcasting can be received. Moreover, when the television set is connected to a communication network with or without wires via the modem, one-way (from a sender to a receiver) or two-way (between a sender and a receiver or between receivers) information communication can be performed.

This embodiment can be implemented in appropriate combination with the structures described in the other embodiments.

EXAMPLE

In this example, a liquid crystal display device manufactured in accordance with Embodiment 1 will be described together with a comparative example.

Structural formulae of organic compounds used in this example are shown below.

Manufacturing methods of a liquid crystal display device in this example and a liquid crystal display device in a comparative example are described below.

(Manufacturing Methods of Liquid Crystal Display Device in this Example)

First, a resin gap spacer with a height of 4 μm and a photocurable and thermosetting sealant (SD-25, produced by Sekisui Chemical Co., Ltd.) were formed over a 5-inch glass substrate used as a first substrate. In addition, circuits of a transistor, including an electrode layer for driving a liquid crystal layer, and the like were formed over a 5-inch glass substrate used as a second substrate.

Next, the sealant was temporally cured by irradiating the first substrate over which the sealant was formed with ultraviolet rays (11 mW/cm$^2$) with a main wavelength of 365 nm.

Next, a liquid crystal composition including commercially available materials shown in Table 1 was dropped inside the sealant over the first substrate.

TABLE 1

| | Material | Proportion (wt %) |
|---|---|---|
| Liquid crystal material | mixed liquid crystal E-8 (produced by LCC Co., Ltd.) | 34.0 |
| | 4-(trans-4-n-propylcyclohexyl)-3',4'-difluoro-1,1'-biphenyl (abbreviation: CPP-3FF) (produced by | 25.5 |

[Chemical Formulae 1]

CPP-3FF

PEP-5CNF

ISO-(6OBA)$_2$

Dac-PP-O6 dodecyl 2-methylacrylate

DMPAP

TABLE 1-continued

| | Material | Proportion (wt %) |
|---|---|---|
| | Daily Polymer Corp.) 4-n-pentylbenzoic acid 3-fluoro-4-cyanophenyl (abbreviation: PEP-5CNF) (produced by Daily Polymer Corp.) | 25.5 |
| Photo-curable resin | dodecyl 2-methylacrylate (produced by Tokyo Chemical Industry Co., Ltd.) | 4.0 |
| | 4,4'-bis(6-acryloyl-n-hexyl-1-oxy)-1,1'-biphenyl (abbreviation: Dac-PP-O6) (produced by SYNTHON Chemicals GmbH & Co. KG) | 4.0 |
| photopoly-merization initiator | 2,2-dimethoxy-2-phenylacetophenone (produced by Tokyo Chemical Industry Co., Ltd.) | 0.2 |
| Chiral agent | 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.) | 6.9 |
| Total | | 100.0 |

The phase transition temperature between a blue phase and an isotropic phase of the liquid crystal composition shown in Table 1 was 31.3° C. Further, in the liquid crystal composition, the phase transition temperature between a blue phase and an isotropic phase in the state where only a liquid crystal material and a chiral agent were mixed was 44.7° C.

When the liquid crystal composition was dropped, the temperature of the liquid crystal composition was set to 70° C. which is a temperature at which an isotropic phase is exhibited, and the liquid crystal material of about 14 mg was dropped inside the sealant.

Next, the second substrate was attached to the first substrate. Here, the second substrate was fixed to an upper side of a chamber with an electrostatic chuck, and the first substrate on which the liquid crystal composition is dropped was placed on a lower side of the chamber. Then, the pressure inside the chamber was reduced to 100 Pa, and the first substrate and the second substrate were attached to each other. After that, the chamber was exposed to the air.

Next, a substrate was placed on a stage having a heat source, a liquid crystal layer interposed between the first substrate and the second substrate was heated to 70° C., and an isotropic phase was exhibited.

Next, the polymer stabilization treatment was performed on a liquid crystal layer exhibiting an isotropic phase, and the liquid crystal layer exhibited a blue phase. The polymer stabilization treatment was performed in such a manner that after the liquid crystal layer was rapidly cooled to 34° C. at −5° C./min, irradiation with ultraviolet rays (1.5 mW/cm$^2$) with a main wavelength of 365 nm was performed for 30 minutes while the temperature was kept at 34° C. at which the isotropic phase spreads over the entire surface.

Then, heat treatment was performed to cure the sealant fully. Thus, the liquid crystal display device of this example was manufactured.

(Manufacturing Methods of Liquid Crystal Display Device in Comparative Example)

In a liquid crystal display device in a comparative example, the steps up to attachment of the first substrate and the second substrates were performed in a manner similar to that of the above-described liquid crystal display device in this example.

After the step of the attachment, the polymer stabilization treatment was performed on a liquid crystal layer interposed between the first substrate and the second substrate. The polymer stabilization treatment was performed in such a manner that after the liquid crystal layer was heated to 70° C., the temperature was decreased by one degree per minute from 70° C. in order that a phase may transfer from an isotropic phase to a blue phase, and then irradiation with ultraviolet rays (1.5 mW/cm$^2$) with a main wavelength of 365 nm was performed for 30 minutes while the temperature at which the blue phase spread over the entire surface was kept. Temperatures in irradiation with ultraviolet rays were set to 28° C. and 30° C.

Then, heat treatment was performed to cure the sealant fully. Thus, the liquid crystal display device in the comparative example was manufactured.

Figure 7A:
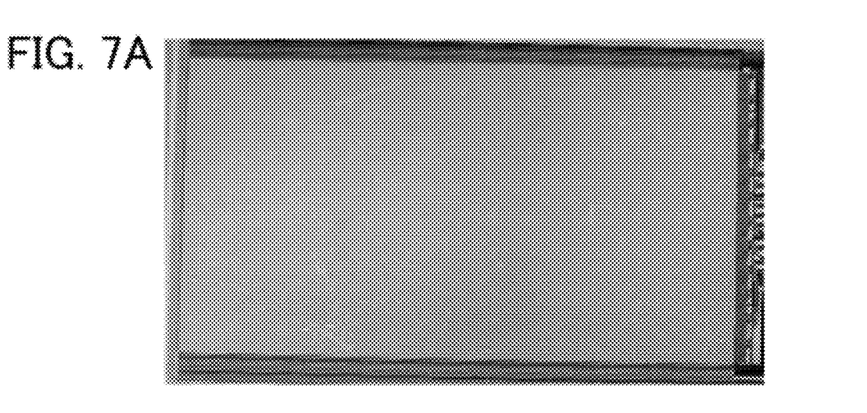
FIGS. 7A to 7C are photographs showing appearances of a liquid crystal display device manufactured in Example.
Figure 7B:
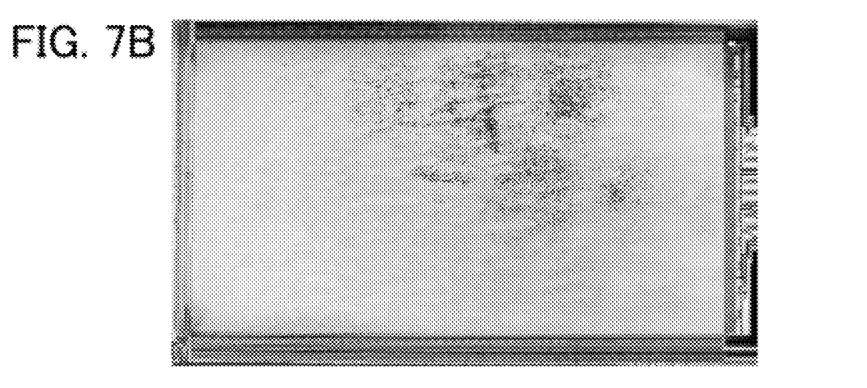
Figure 7C:
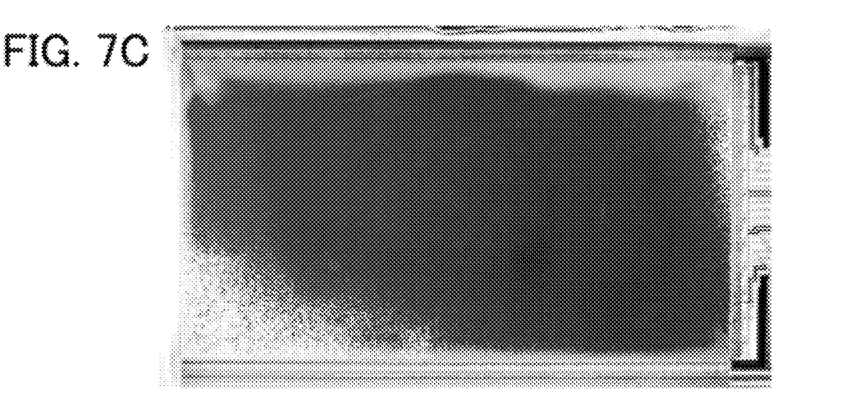

FIG. 7A is a photograph showing an appearance of a liquid crystal display device in this example. FIG. 7B is a photograph showing an appearance of a liquid crystal display device in the comparative example on which the polymer stabilization treatment is performed with the temperature kept at 28° C., and FIG. 7C is a photograph showing an appearance of a liquid crystal display device in the comparative example on which the polymer stabilization treatment is performed with the temperature kept at 30° C.

As shown in FIG. 7B, in the liquid crystal display device in the comparative example on which the polymer stabilization treatment was performed with the temperature kept at 28° C., light leakage due to the phase transition to a cholesteric phase was generated in the entire surface in a display region. Further, as shown in FIG. 7C, in the liquid crystal display device in the comparative example on which the polymer stabilization treatment was performed with the temperature kept at 30° C., an alignment defect was suppressed more than that of FIG. 7B; however, there was a region where leakage of light was generated in a display region, particularly around the sealant. On the other hand, as shown in FIG. 7A, in the liquid crystal display device in this example, an alignment defect in a display region was not found.

As described above, by using a manufacturing method of one embodiment of the present invention, it was found that an alignment defect in the liquid crystal display device was able to be suppressed.

This application is based on Japanese Patent Application serial no. 2010-267148 filed with Japan Patent Office on Nov. 30, 2010, the entire contents of which are hereby incorporated by reference.

What is claimed is:

1. A method for manufacturing a liquid crystal display device, comprising the steps of:
providing a first substrate and a second substrate attached to each other by a sealant with a liquid crystal layer comprising a liquid crystal composition interposed therebetween;
performing heat treatment so as to set an alignment state of the liquid crystal layer to be an isotropic phase;
performing cooling treatment after the heat treatment so as to cool the liquid crystal layer more than 10° C.; and
irradiating the liquid crystal layer with light after the cooling treatment so that polymer stabilization treatment is performed on the liquid crystal layer,
wherein an alignment state of the liquid crystal layer is kept in an isotropic phase during the cooling treatment, and
wherein the alignment state of the liquid crystal layer is changed from the isotropic phase to a blue phase during the light irradiation.

2. A method for manufacturing a liquid crystal display device according to claim 1, wherein the composition comprises a liquid crystal material, a chiral agent, a photocurable resin, and a photopolymerization initiator.

3. A method for manufacturing a liquid crystal display device according to claim 2, wherein the photocurable resin is polymerized with the light.

4. A method for manufacturing a liquid crystal display device, comprising the steps of:
   forming a sealant so as to form a frame over a first substrate;
   dropping a liquid crystal composition inside the frame formed using the sealant;
   attaching a second substrate to the first substrate in a reduced-pressure atmosphere so as to form a liquid crystal layer;
   performing heat treatment so as to set an alignment state of the liquid crystal layer to be an isotropic phase;
   performing cooling treatment after the heat treatment so as to cool the liquid crystal layer more than 10° C.; and
   irradiating the liquid crystal layer with light after the cooling treatment so that polymer stabilization treatment is performed on the liquid crystal layer,
   wherein an alignment state of the liquid crystal layer is kept in an isotropic phase during the cooling treatment, and
   wherein an alignment state of the liquid crystal layer is changed from an isotropic phase to a blue phase during the light irradiation.

5. A method for manufacturing a liquid crystal display device according to claim 4, wherein the composition comprises a liquid crystal material, a chiral agent, a photocurable resin, and a photopolymerization initiator.

6. A method for manufacturing a liquid crystal display device according to claim 5, wherein the photocurable resin is polymerized with the light.

7. A method for manufacturing a liquid crystal display device, comprising the steps of:
   forming a sealant so as to form a frame over a first substrate;
   curing the sealant temporally by irradiating light;
   dropping a liquid crystal composition inside the frame formed using the sealant temporally cured;
   attaching a second substrate to the first substrate in a reduced-pressure atmosphere so as to form a liquid crystal layer;
   performing heat treatment so as to set an alignment state of the liquid crystal layer to be an isotropic phase;
   performing cooling treatment after the heat treatment so as to lower a temperature of the liquid crystal layer by 10° C. or more; and
   irradiating the liquid crystal layer with light after the cooling treatment so that the sealant is fully cured, polymer stabilization treatment is performed on the liquid crystal layer,
   wherein an alignment state of the liquid crystal layer is kept in an isotropic phase during the cooling treatment, and
   wherein the alignment state of the liquid crystal layer is changed from the isotropic phase to a blue phase during the light irradiation.

8. A method for manufacturing a liquid crystal display device according to claim 7, wherein the composition comprises a liquid crystal material, a chiral agent, a photocurable resin, and a photopolymerization initiator.

9. A method for manufacturing a liquid crystal display device according to claim 8, wherein the photocurable resin is polymerized with the light.

10. A method for manufacturing a liquid crystal display device, comprising the steps of:
    forming a sealant so as to form a frame over a first substrate;
    dropping a liquid crystal composition inside the frame formed using the sealant;
    curing the sealant temporally by irradiating light;
    attaching a second substrate to the first substrate in a reduced-pressure atmosphere so as to form a liquid crystal layer;
    performing heat treatment so as to set an alignment state of the liquid crystal layer to be an isotropic phase;
    performing cooling treatment after the heat treatment so as to cool the liquid crystal layer more than 10° C.; and
    irradiating the liquid crystal layer with light after the cooling treatment so that the sealant is fully cured, polymer stabilization treatment is performed on the liquid crystal layer,
    wherein an alignment state of the liquid crystal layer is kept in an isotropic phase during the cooling treatment, and
    wherein the alignment state of the liquid crystal layer is changed from the isotropic phase to a blue phase during the light irradiation.

11. A method for manufacturing a liquid crystal display device according to claim 10, wherein the composition comprises a liquid crystal material, a chiral agent, a photocurable resin, and a photopolymerization initiator.

12. A method for manufacturing a liquid crystal display device according to claim 11, wherein the photocurable resin is polymerized with the light.

13. A method for manufacturing a liquid crystal display device according to claim 1, wherein an isotropic phase spreads over an entire surface of the liquid crystal layer during the cooling treatment.

14. A method for manufacturing a liquid crystal display device according to claim 4, wherein an isotropic phase spreads over an entire surface of the liquid crystal layer during the cooling treatment.

15. A method for manufacturing a liquid crystal display device according to claim 7, wherein an isotropic phase spreads over an entire surface of the liquid crystal layer during the cooling treatment.

16. A method for manufacturing a liquid crystal display device according to claim 10, wherein an isotropic phase spreads over an entire surface of the liquid crystal layer during the cooling treatment.

17. A method for manufacturing a liquid crystal display device according to claim 13, wherein a temperature of the liquid crystal layer is set to be higher than a phase transition temperature between a blue phase and an isotropic phase of the liquid crystal layer by 10° C. or more by performing the heat treatment.

18. A method for manufacturing a liquid crystal display device according to claim 14, wherein a temperature of the liquid crystal layer is set to be higher than a phase transition temperature between a blue phase and an isotropic phase of the liquid crystal layer by 10° C. or more by performing the heat treatment.

19. A method for manufacturing a liquid crystal display device according to claim 15, wherein a temperature of the liquid crystal layer is set to be higher than a phase transition temperature between a blue phase and an isotropic phase of the liquid crystal layer by 10° C. or more by performing the heat treatment.

20. A method for manufacturing a liquid crystal display device according to claim 16, wherein a temperature of the liquid crystal layer is set to be higher than a phase transition temperature between a blue phase and an isotropic phase of the liquid crystal layer by 10° C. or more by performing the heat treatment.

* * * * *